United States Patent
Ko et al.

(10) Patent No.: US 10,259,380 B2
(45) Date of Patent: Apr. 16, 2019

(54) DUAL LIGHT PATH FORMING TYPE PROJECTION OPTICAL SYSTEM AND HEAD LAMP AND VEHICLE TO WHICH THE SAME OPTICAL SYSTEM IS APPLIED

(71) Applicants: Hyundai Motor Company, Seoul (KR); Kia Motors Corporation, Seoul (KR)

(72) Inventors: Kwang-Min Ko, Suwon-si (KR); Yang-Gi Lee, Suwon-si (KR); Sung-Uk Choi, Suwon-si (KR); Deug-Heon Kang, Hwaseong-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 135 days.

(21) Appl. No.: 15/371,008

(22) Filed: Dec. 6, 2016

(65) Prior Publication Data

US 2017/0328533 A1    Nov. 16, 2017

(30) Foreign Application Priority Data

May 13, 2016   (KR) ........................ 10-2016-0058828

(51) Int. Cl.
*B60Q 1/068*    (2006.01)
*F21S 43/241*   (2018.01)
*B60Q 1/00*     (2006.01)
*F21S 41/17*    (2018.01)
*F21S 41/20*    (2018.01)
(Continued)

(52) U.S. Cl.
CPC ......... *B60Q 1/0683* (2013.01); *B60Q 1/0076* (2013.01); *F21S 41/17* (2018.01); *F21S 41/255* (2018.01); *F21S 41/285* (2018.01); *F21S 41/36* (2018.01); *F21S 41/635* (2018.01);
(Continued)

(58) Field of Classification Search
CPC .. B60Q 1/0047; B60Q 1/0076; B60Q 1/0683; F21S 41/635; F21S 41/10; F21S 41/20; F21S 41/24; F21S 41/321; F21S 41/17; F21S 41/36; F21S 41/285; F21S 41/255; F21S 41/365; F21S 43/40; F21W 2102/13
See application file for complete search history.

(56) References Cited

U.S. PATENT DOCUMENTS

2012/0113663 A1    5/2012   Kim

FOREIGN PATENT DOCUMENTS

JP    2012-162121 A     8/2012
KR    10-2002-0088913 A  11/2002
(Continued)

*Primary Examiner* — Hargobind S Sawhney
(74) *Attorney, Agent, or Firm* — Morgan, Lewis & Bockius LLP (57) ABSTRACT

A dual light path forming type projection optical system may include a reflector allowing light generated from a light source to be formed into a lower reflecting light reflected to an upward path directing upward and an upper reflecting light reflected to a downward path directing downward, a prism lens allowing the upper reflecting light to be emitted as a prism low beam in which the downward path is changed into the upward path and allowing the prism low beam to be changed into a prism high beam by changing an incident angle of the upper reflecting light, and an aspheric lens for generating a low beam by allowing the prism low beam to be added to the lower reflecting light and generating a high beam by allowing the prism high beam to be added to the lower reflecting light.

18 Claims, 11 Drawing Sheets

(51) Int. Cl.
*F21S 41/255* (2018.01)
*F21S 41/36* (2018.01)
*F21S 41/63* (2018.01)
*F21S 43/245* (2018.01)
*F21S 41/365* (2018.01)

(52) U.S. Cl.
CPC ........... *F21S 43/241* (2018.01); *F21S 41/365* (2018.01); *F21S 43/245* (2018.01)

(56) References Cited

FOREIGN PATENT DOCUMENTS

| KR | 10-2012-0050271 A | 5/2012 |
|----|-------------------|--------|
| KR | 10-2012-0054159 A | 5/2012 |
| KR | 20150068143 A | 6/2015 |
| KR | 20160035391 A | 3/2016 |

<LOW BEAM>

<HIGH BEAM>

DUAL LIGHT PATH FORMING TYPE PROJECTION OPTICAL SYSTEM AND HEAD LAMP AND VEHICLE TO WHICH THE SAME OPTICAL SYSTEM IS APPLIED

CROSS-REFERENCE(S) TO RELATED APPLICATIONS

The present application claims priority to Korean Patent Application No. 10-2016-0058828, filed on May 13, 2016, the entire contents of which is incorporated herein for all purposes by this reference.

BACKGROUND OF THE INVENTION

Field of the Invention

The present invention relate to a projection headlamp, and more particularly to a dual light path forming type projection optical system that can use light which has been thrown away by being blocked by a shield as well as a projection headlamp and a vehicle to which the projection optical system is applied.

Description of Related Art

Typically, a vehicle headlamp uses a light source installed in the center of a hemispherical shaped reflector having thin thickness as a light source and it is configured in such a manner that a direction of irradiating the light source is regulated to either a high beam condition or a low beam condition by manipulation of a switch by a driver.

A projection headlamp among such headlamps adopts a projection optical system in which the lamp itself is constituted as a unit.

As an example, the projection headlamp includes a light source, a reflector forming an elliptical reflecting surface on which a filament of the light source is formed as a first focus and the light from the light source is reflected, a projection holder forming a second focus while blocking a portion of the light by a shield, an aspheric lens allowing the light to be transmitted therethrough, and a lamp lens (or outer lens) allowing the light to be transmitted therethrough and then illuminate a road surface. In this case, a group of the light source, the reflector, the projection holder and the aspherical lens is referred to as a projection optical system. In particular, the shield that is a cut-off component for blocking the light source of the upper portion of the reflector is a prerequisite component for meeting laws and regulations requiring that the light source shall be irradiated within a low beam area.

Therefore, according to the projection headlamp, the light generated in the light source located in the first focal plane of the elliptical reflecting surface of the reflector is reflected on the elliptical reflecting surface, the reflected light passes over the second focal point and is transmitted through the aspheric lens, and then the light transmitted through the aspheric lens is irradiated to the front road surface through the lamp lens However, the projection optical system applied to the projection headlamp is implemented in a low luminous efficiency and hence a lot of light is not used.

Low luminous efficiency can be seen from the following calculation formula of efficiency of the projection optical system.

Efficiency of projection optical system (%)=transmittance of lamp lens×transmittance of aspheric lens×efficiency of shield×reflectance of reflector×(effective solid angle of reflector/effective solid angle of light source)

Where the transmittance of lens indicates a transmission factor, the efficiency of shield indicates a blocking factor, and the reflectance of mirror indicates a reflecting factor.

For example, if the effective solid angle of the light source is 12.56 steradian (sr), the effective solid angle of the reflector is 9.93 steradian, the reflectance of the reflector is 85%, the efficiency of the shield is 60%, the transmittance of the aspheric lens is 85%, and the transmittance of the lamp lens 88%, then the efficiency (%) of the projection optical system is as follows:

$$0.3016 = 0.88 \times 0.85 \times 0.6 \times 0.85 \times (9.93/12.56)$$

Where the symbol "×" is the multiplication sign.

It can be seen from this that in order to improve the low luminous efficiency of 30.2%, all or each of the transmission factor, the blocking factor and the reflecting factor must be improved. However, improvement of the transmittance and the reflectance is very difficult technically. Furthermore, since the shield is required to block the upper reflecting light which is reflected on the reflector and directs downward in order to meet the related laws and regulations, improvement of the shield by a manner that the upper reflecting light is not blocked is inevitably difficult due to the restriction by the related laws and regulations.

As a result, in a vehicle in which a projection optical system having a low luminous efficiency of 30.2% is applied as a projection headlamp, quantity of light of the low beam is inevitably low and further the low beam having such low quantity of light makes it difficult to meet the requirements of the driver driving at night who wishes to secure a brighter front field of view.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a dual light path forming type projection optical system that can increase luminance efficiency of the projection optical system significantly without any necessary to improve a transmission factor, a blocking factor and a reflection factor, which are difficult to improve, by utilizing light reflected on upper and lower portions of a reflector in irradiating light beam through changeover of light path by a polarization angle prism lens, and that can provide the front field of view at night more brightly by a low beam and a high beam both having high quantity of light formed by adding the light reflected on the upper portion of the reflector, which has been blocked and hence not been used when a shield is applied, to quantity of light of the low beam and the high beam. In addition, it is to provide a headlamp and a vehicle to which the projection optical system is applied.

Other objects and advantages of the present invention can be understood by the following description, and become apparent with reference to the embodiments of the present invention. Also, it is obvious to those skilled in the art to which the present invention pertains that the objects and advantages of the present invention can be realized by the means as claimed and combinations thereof.

In accordance with one aspect of the present invention for obtaining the object as mentioned above, various aspects of the present invention are directed to providing a dual light path forming type projection optical system including: a reflector allowing light generated from a light source to be formed into a lower reflecting light reflected to an upward path directing upward and an upper reflecting light reflected to a downward path directing downward simultaneously; a prism lens allowing the upper reflecting light to be emitted as a prism low beam in which the downward path is changed into the upward path and allowing the prism low beam to be changed into a prism high beam by changing an incident angle of the upper reflecting light; and an aspheric lens for generating a low beam by allowing the prism low beam to be added to the lower reflecting light and generating a high beam by allowing the prism high beam to be added to the lower reflecting light.

In an exemplary embodiment, the path of the lower reflecting light is formed above the path of the prism low beam and the path of the prism high beam and rotation of the prism lens causes a change of the incident angle.

In an exemplary embodiment, the prism lens is subdivided into a light source incident surface forming an incident angle, a light source output surface forming an output angle, a light source reflecting surface opposite to the light source output surface, and a prism forming surface opposite to the light source incident surface, wherein the light source incident surface is orthogonal to the light source output surface.

In an exemplary embodiment, a compensating lens is positioned beside the aspheric lens between the aspheric lens and the prism lens in a position deviated from the path of the lower reflecting light directing to the aspheric lens, wherein the compensating lens compensates each of the prism low beam and the prism high beam.

In an exemplary embodiment, the reflector is formed in a funnel shape forming a reflecting surface for reflecting each of the lower reflecting light and the upper reflecting light, wherein the reflecting surface is formed in an elliptical shape.

In an exemplary embodiment, the reflector and the aspheric lens are connected by a projection holder, the prism lens is positioned in the inside space of the projection holder, a sitting rim is coupled with the projection holder, and the sitting rim maintains the assembled condition of the projection holder and the aspheric lens.

In accordance with another aspect of the present invention for obtaining the object as mentioned above, various aspects of the present invention are directed to providing a projection headlamp including: a projection optical system including a reflector allowing a path of light generated from a light source to be formed into a lower reflecting light and an upper reflecting light simultaneously, a prism lens allowing the upper reflecting light to be changed into a prism low beam and a prism high beam by changing an incident angle, an aspheric lens for generating a low beam in which the prism low beam is added to the lower reflecting light and generating a high beam in which the prism high beam is added to the lower reflecting light, a projection holder for connecting the reflector and the aspheric lens while allowing the prism lens to be positioned in the inside space thereof, a compensating lens positioned beside the aspheric lens to compensate each of the prism low beam and the prism high beam, and a sitting rim coupled with the projection holder in which the aspheric lens is positioned; a lamp lens for irradiating forward each of the low beam and the high beam emitted from the projection optical system; and a lamp housing to which the lamp lens is coupled.

In an exemplary embodiment, the projection headlamp further includes a terminal connector provided in the lamp housing to allow the projection optical system to be supplied with power and allow control signal to be input and a lens actuator provided in the lamp housing to select one of the low beam and the high beam of the projection optical system.

In an exemplary embodiment, the projection headlamp further includes an adaptive driving beam (ADB) shield for forming a shadow zone in the high beam of the projection optical system.

Furthermore, in accordance with still another aspect of the present invention for obtaining the object as mentioned above, various aspects of the present invention are directed to providing the vehicle including a projection headlamp including a projection optical system, wherein the projection optical system includes a reflector allowing a path of light generated from a bulb to be formed into a lower reflecting light and an upper reflecting light simultaneously, a prism lens allowing the upper reflecting light to be changed into a prism low beam and a prism high beam by changing an incident angle, an aspheric lens for generating a low beam in which the prism low beam is added to the lower reflecting light and generating a high beam in which the prism high beam is added to the lower reflecting light, a projection holder for connecting the reflector and the aspheric lens while allowing the prism lens to be positioned in the inside space thereof, a compensating lens positioned beside the aspheric lens to compensate each of the prism low beam and the prism high beam, and a sitting rim coupled with the projection holder in which the aspheric lens is positioned, and wherein the projection headlamp is applied as a headlight on both left and right sides of the vehicle.

In an exemplary embodiment, the projection headlamp further includes an adaptive driving beam (ADB) shield wherein the ADB shield forms a shadow zone in the high beam of the projection optical system.

According to this projection headlamp of the present invention, the projection optical system forms a dual light path in the inside thereof so that the following advantages and effects are realized.

First, as the light path can be changed by the prism lens, a rate of utilization of light source is increased significantly with the same effect as when a shield is applied while meeting laws and regulations related to projection headlamps. Second, as the light reflected on the upper portion of a reflector, which has been thrown away when a shield is applied, is added to quantity of light of the low beam and the high beam by the action of the prism, so that luminance efficiency of the projection headlamp is greatly improved. Third, by application of the prism lens, it is possible to improve performance of a projection headlamp without any difficulty in technical approaches to improve including a transmission factor, a blocking factor and a reflection factor. Fourth, as the light path of the prism lens is added to the conventional low beam path and forms a dual light path, performance of the low beam is enhanced up to approximately 45% compared to the conventional low beam. Fifth, switching from a high beam to a low beam and vice versa can be made only by changing a light path of the prism lens, expanding bifunctional function. Sixth, chrominance separation and compensation of a predetermined undesired angle of the light from the prism can be easily made by associating the compensating lens with the prism lens. Seventh, it is also possible to cut off adaptive driving beam (ADB) function by associating the prism shield having ADB function with the prism lens.

The methods and apparatuses of the present invention have other features and advantages which will be apparent from or are set forth in more detail in the accompanying drawings, which are incorporated herein, and the following Detailed Description, which together serve to explain certain principles of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Figure 1:
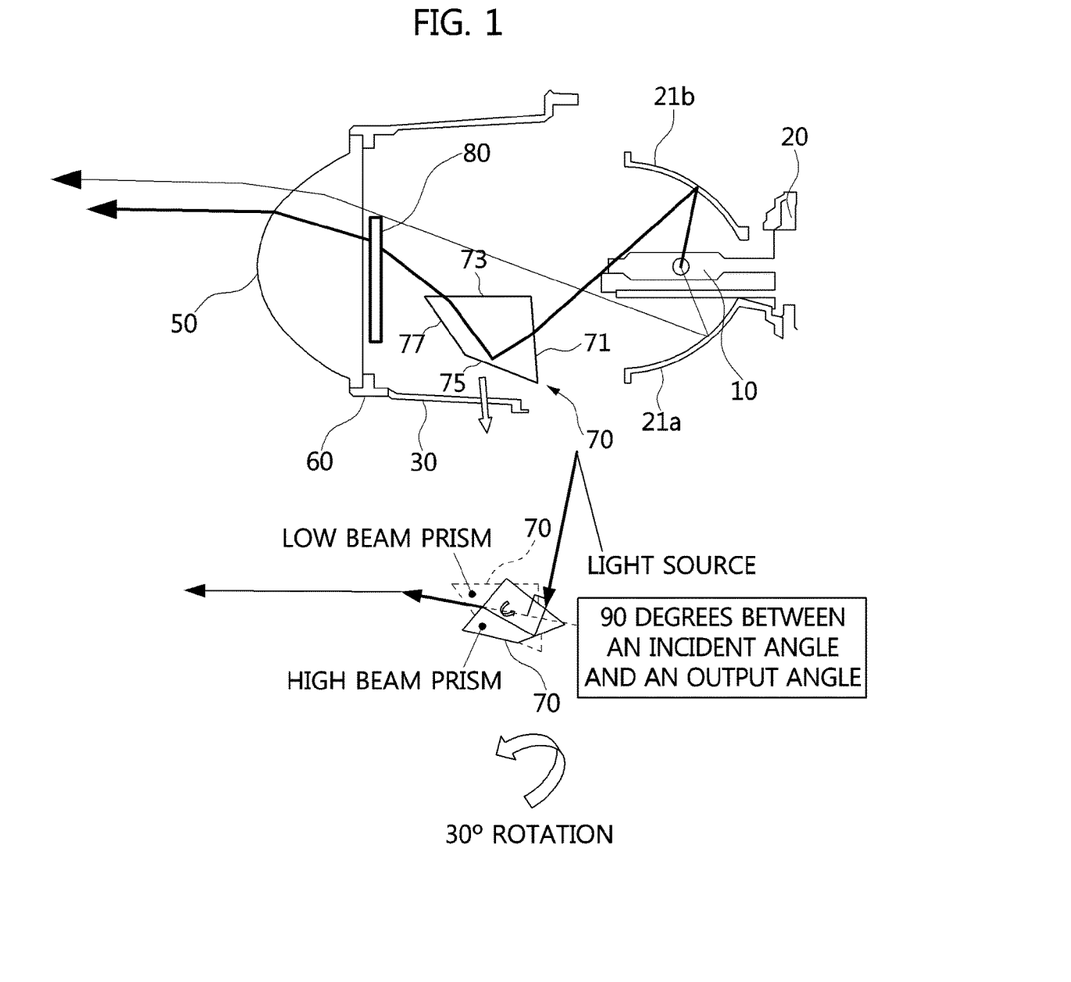
FIG. 1 is a view illustrating inside configuration of a dual light path forming type projection optical system according to an exemplary embodiment of the present invention.

Referring to FIG. 1, a projection optical system 9 includes a light source 10, a reflector 20, a projection holder 30, an aspheric lens 50, a sitting rim 60, a prism lens 70, and a compensating lens 80.

The light source 10 is a light source for generating light, which may include a filament, and it is coupled with the reflector 20. The light source 10 is coupled from the rear side of the reflector 20 and positioned in the center of the reflector, while the projection holder 30 is coupled in front of the reflector. The projection holder 30 connects the reflector 20 and the aspheric lens 50, and acts as a path through which light reflected from the reflector 20 moves. The aspheric lens 50 allows the lower reflecting light reflected on a lower reflecting surface 21a of the reflector 20 to transmit therethrough. The sitting rim 60 includes an annular ring and keeps the engaged state between the projection holder 30 and the aspheric lens 50.

The prism lens 70 is subdivided into four surfaces, i.e., a light source incident surface 71, a light source output surface 73, a light source reflecting surface 75 and a prism forming surface 77. A path of the light passing through the prism lens 70 forms refraction of an incident path by transmission of the light source incident surface 71, turnover of a reflecting path by reflection of the light reflecting surface 75 and refraction of an output path by transmission of the light source output surface 73, wherein the light emitting from the light source output surface 73 by refraction of the output path is turned by 90 degrees with respect to an incident angle.

The compensating lens 80 performs chrominance separation of the light output from the prism lens 70 and compensation of an angle of undesired light at a position before the step where the prism lens 70 transfers the upper reflecting light reflected on an upper reflecting surface 21b of the reflector 20 to the aspheric lens 50.

Therefore, the projection optical system 9 forms a dual light path where the upper reflecting light which has been blocked by a shield and not been utilized can be mixed with the lower reflecting light by the action of the prism lens 70.

As an example, when the projection optical system 9 is operated, the light source 10 serving as a light source generates light. The light generated is reflected on lower and upper portions of the reflector 20 respectively, wherein the lower reflecting light is reflected in an upward direction and then projected directly to the aspheric lens 50 so that it is formed as a low beam path, while the upper reflecting light is reflected in a downward direction and turned to an upward direction by the prism lens 70 and then projected to the aspheric lens 50 through the compensating lens 80 so that it is formed as a prism path. The light of the low beam path and the light of the prism path are transmitted through the aspheric lens 50 and irradiated in front of the aspheric lens 50.

The projection optical system 9 can change an output angle of the upper reflecting light by about reflector 20 respectively, wherein the lower reflecting light is reflected in an upward direction and then projects. The prism low beam allows quantity of light of the low beam to increase, while the prism high beam allows the low beam to be formed as the high beam.

Figure 2:
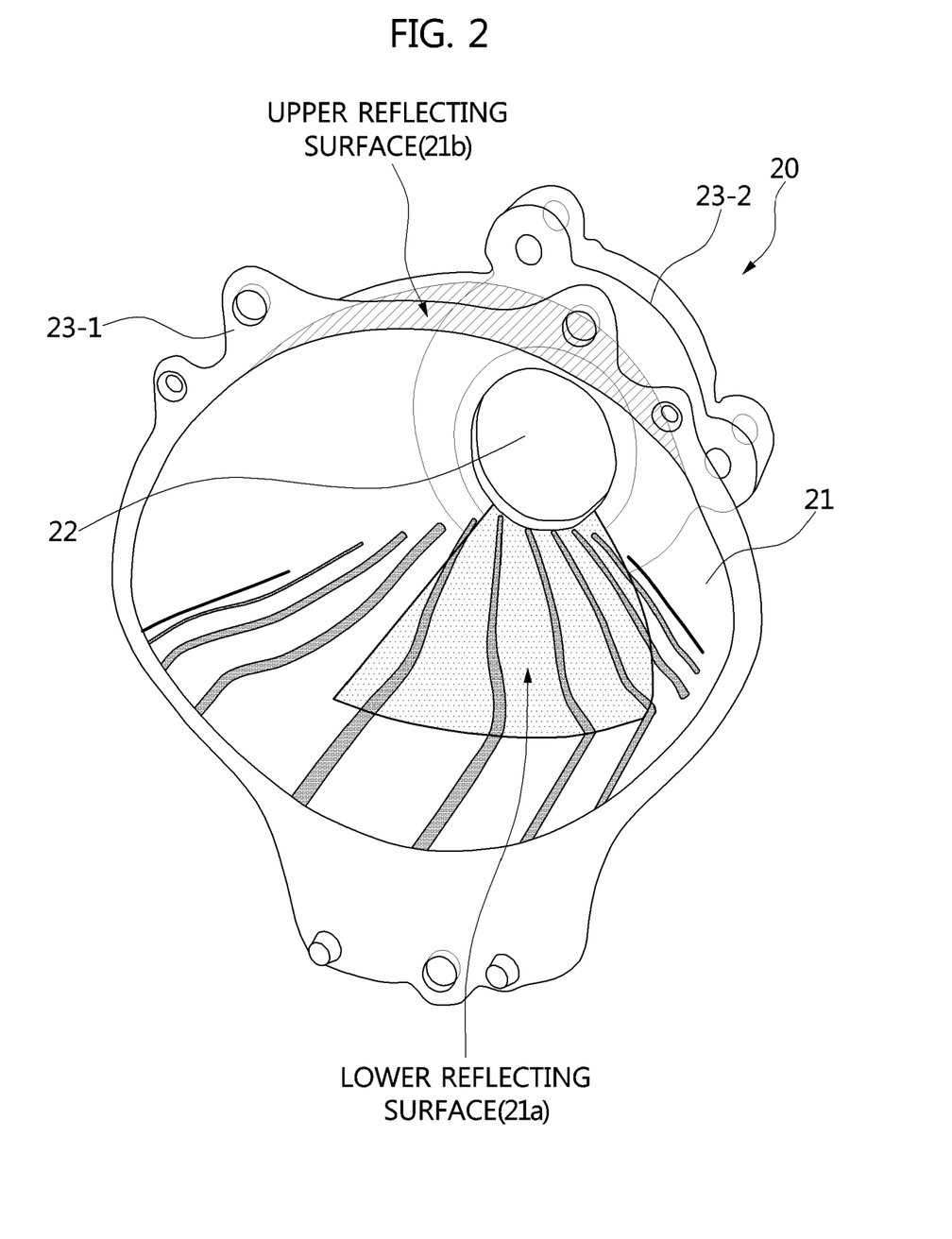
FIG. 2 is a view illustrating an example of a reflector applied to the projection optical system according to an exemplary embodiment of the present invention.

Referring to FIG. 2, the reflector 20 is formed in a funnel shape and includes a reflecting surface 21, a bulb hole 22 and front and rear reflector flanges 23-1, 23-2. The reflecting surface 21 is formed in an elliptical shape surrounding a filament of the light source 10 positioned in the center thereof and divided into a lower reflecting surface 21a which is a lower space below the filament and an upper reflecting surface 21b which is an upper space above the filament. The bulb hole 22 is formed to pierce the reflecting surface 21 such that the filament of the bulb 10 is fitted therein. The front and rear reflector flanges 23-1, 23-2 are formed on both end portions of the reflecting surface 21, wherein the front reflector flange 23-1 is coupled with the projection holder 30 while the rear reflector flange 23-2 is coupled with a housing of the projection headlamp.

Figure 3:
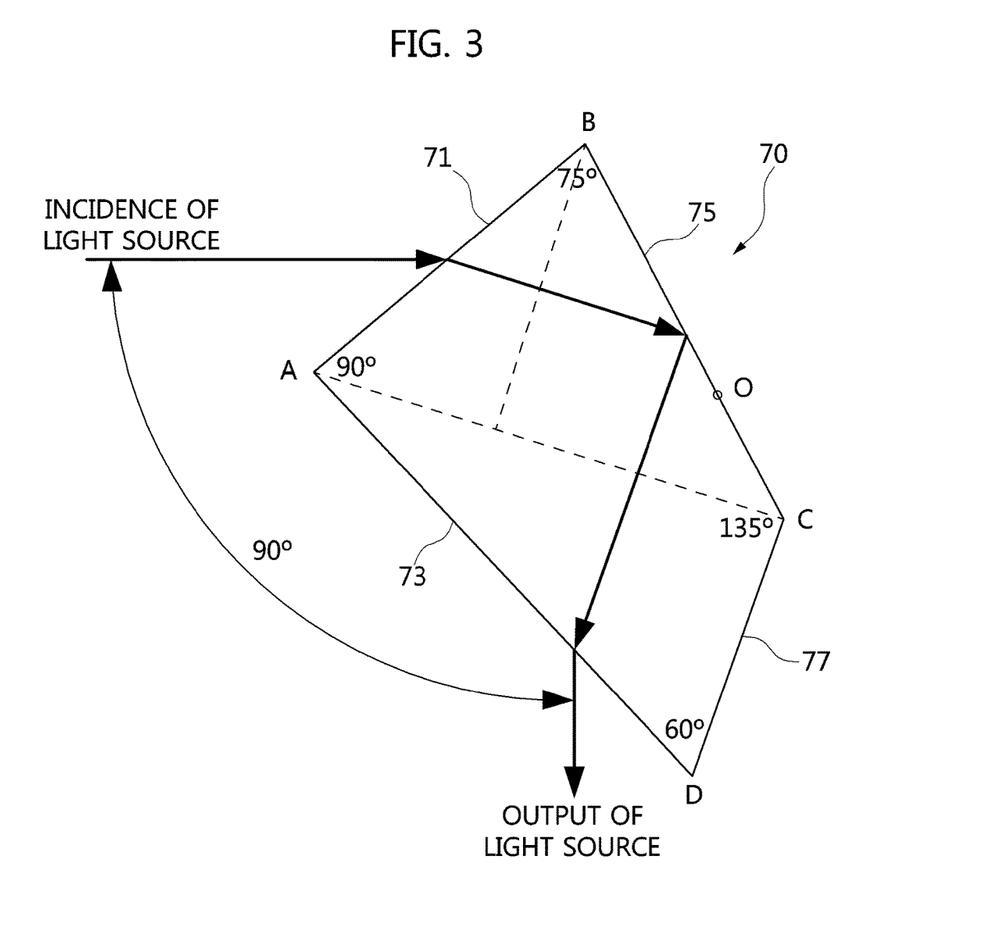
FIG. 3 is a view illustrating an example of a prism lens applied to the projection optical system according to an exemplary embodiment of the present invention.

Referring to FIG. 3, the prism lens 70 is a constant polarization angle type prism lens that maintains a polarization angle at 90° such that an incident angle and an output angle are orthogonal with each other (at right angles to each other) by subdividing it into four surfaces, i.e., a light source incident surface 71, a light source output surface 73, a light source reflecting surface 75 and a prism forming surface 77. For example, an angle of a vertex A between the light source incident surface 71 and the light source output surface 73 is 90 degrees, an angle of a vertex B between the light source incident surface 71 and the light reflecting surface 75 is 75 degrees, an angle of a vertex C between the light source reflecting surface 75 and the prism forming surface 77 is 135 degrees, and an angle of a vertex D between the prism forming surface 77 and the light source output surface 73 is 60 degrees. Therefore, the prism lens 70 is subdivided into a triangle formed by the light source incident surface 71 and the light source output surface 73 and a triangle formed by the light source output surface 73 and the prism forming surface 77.

Figure 4:
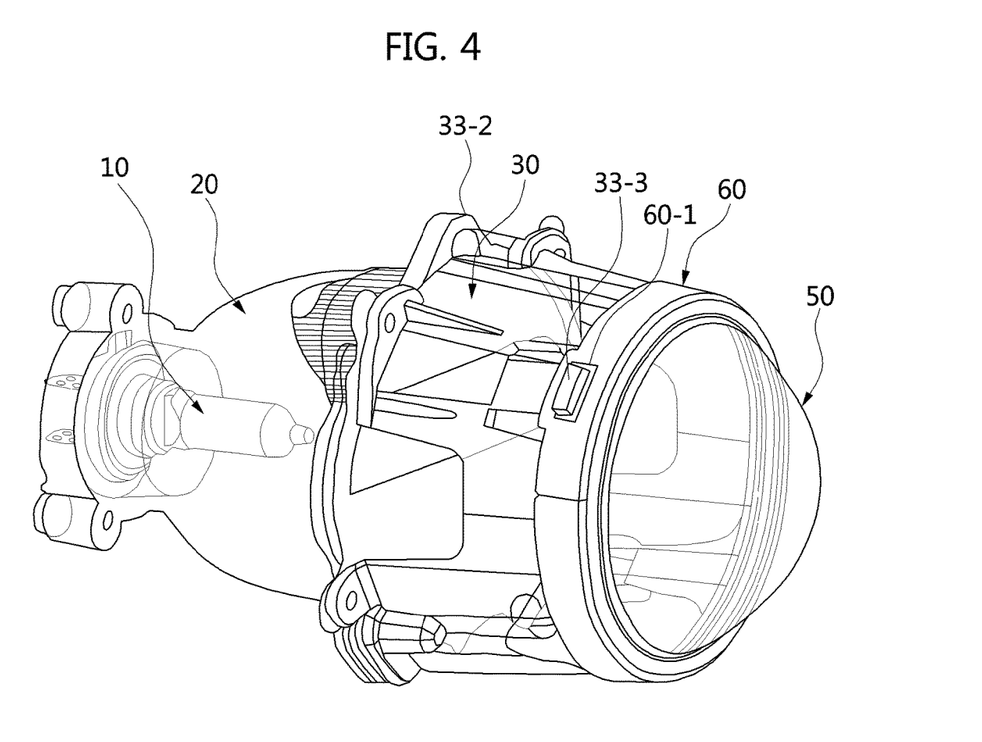
FIG. 4 is a perspective view of the external appearance of a dual light path forming type projection optical system according to an exemplary embodiment of the present invention.

Referring to FIG. 4, a projection optical system 9 includes external parts including a reflector 20, a projection holder 30, an aspheric lens 50 and a sitting rim 60 and inside parts including a bulb 10, a prism lens 70 and a compensating lens 80.

The projection holder 30 includes a rear holder flange 33-2 and a front holder protrusions 33-3, wherein it is screw (or bolt) fastened to the front reflector flange 23-1 of the reflector 20 by the rear holder flange 33-2 and the front holder protrusions 33-3 are coupled with assembly holes 60-1 of the sitting rim 60 so that the front portion to which the aspheric lens 50 is fitted is tightened. As a result, the assembled condition of the reflector 20 and the aspheric lens 50 in the projection optical system 9 is maintained firmly by the action of the projection holder 30.

The light source 10 is strongly bound to the reflector 20 through the light bulb hole 22 of the reflector 20 so that it is prevented from being broken away from the assembled condition. The prism lens 70 is mounted to be rotatable by approximately 30 degrees, utilizing the inside space structure of the projection holder 30 and the compensating lens 80 is erected vertically to be abutted against the lower portion of the aspheric lens 50, utilizing the inside space structure of the projection holder 30. In the instant case, a section where the compensating lens 80 is overlapped with the aspheric lens 50 is restricted to lay on the lower side of the path through which the lower reflecting light is projected to the aspheric lens 50.

Figure 5:
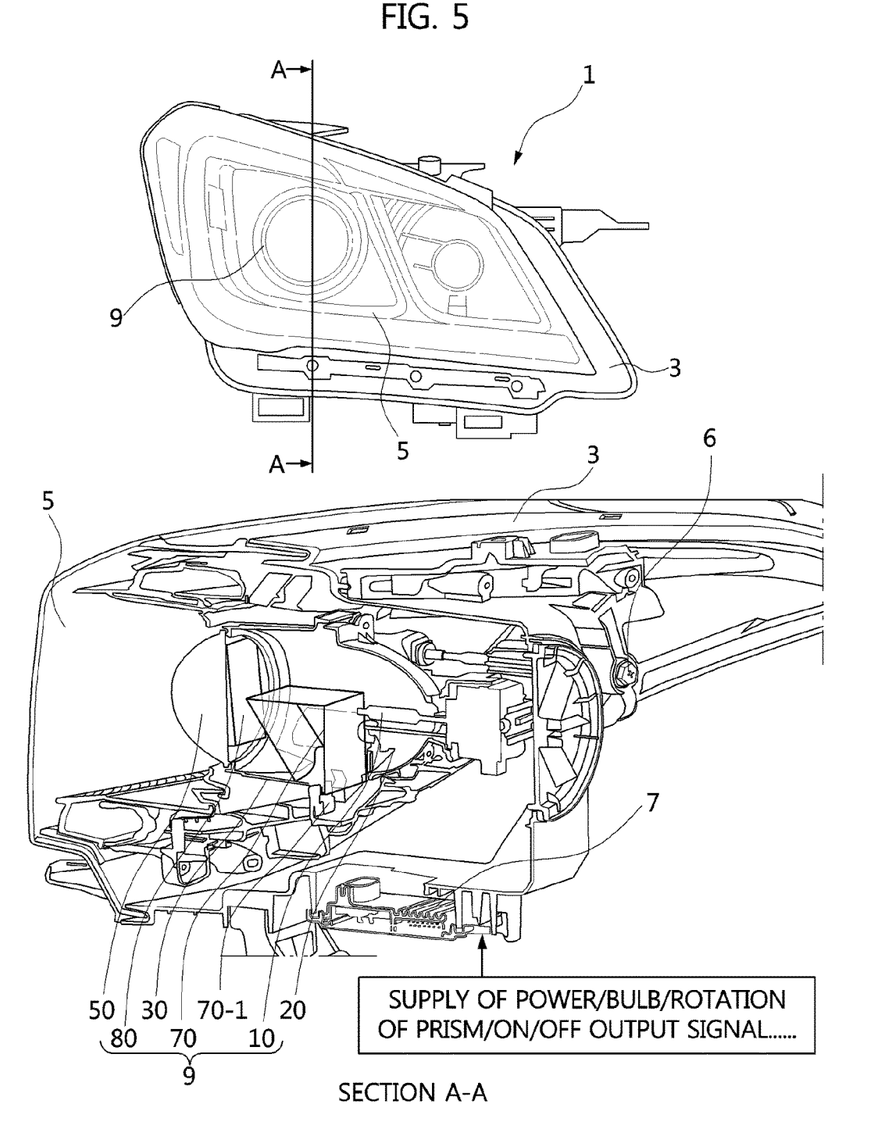
FIG. 5 is a view illustrating configuration of a projection headlamp to which a dual light path forming type projection optical system is applied, according to an exemplary embodiment of the present invention.

Referring to FIG. 5, a projection headlamp 1 includes a projection optical system 9 including a lamp housing 3, a lamp lens 5, an adjusting bolt 6, a terminal connector 7 and a prism lens 70 as its major components, forming a dual light path by the prism lens 70.

The lamp housing 3 forms an inside structure in which the projection optical system 9 is mounted and includes an outside shape tailored to a mounting structure of a vehicle in which the projection headlamp 1 is mounted as a headlamp. The lamp lens 5 is coupled with the front face of the lamp housing 3, and irradiates light emitted from the projection optical system 9 toward the front of the vehicle to secure the driver's front field of view. The adjusting bolt 6 is provided in the lamp housing 3 to adjust an angle and the like for mounting the projection optical system 9 to the vehicle. The terminal connector 7 is connected to an electrical circuit for supplying power when the projection headlamp 1 operates and changeover between the high and the low beam.

The projection optical system 9 includes a light source 10, a reflector 20, a projection holder 30, an aspheric lens 50, a prism lens 70, a lens actuator 70-1 and a compensating lens 80. Therefore, the projection optical system 9 is the same as the projection optical system 9 described through FIGS. 1 to 4.

However, there are differences in that the prism lens 70 is configured together with the lens actuator 70-1 mounted by utilizing the structure of the lamp housing 3 and the projection holder 30 has a structure altered such that the lens actuator 70-1 is associated with the prism lens 70. As a result, when the lens actuator 70-1 rotates the prism lens 70 by approximately 30°, the prism path can be divided into a prism low beam and a prism high beam. The prism low beam forms a low beam by being combined with the low beam in the low beam path, while the prism high beam forms a high beam by being combined with the low beam in the low beam path. As an example, the lens actuator 70-1 may be a step motor or a solenoid valve.

Figure 6:
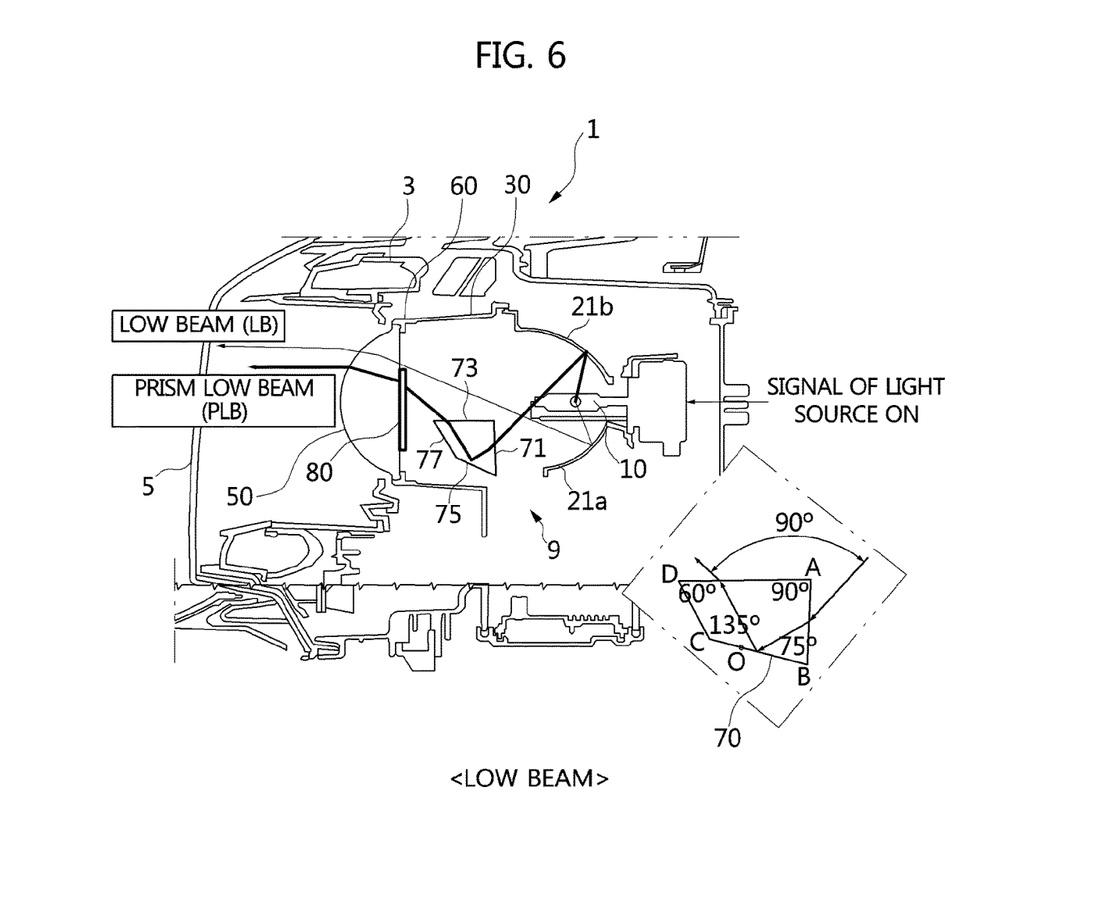
FIG. 6 is a view illustrating a low beam operating state of the projection headlamp according to an exemplary embodiment of the present invention.
Figure 7:
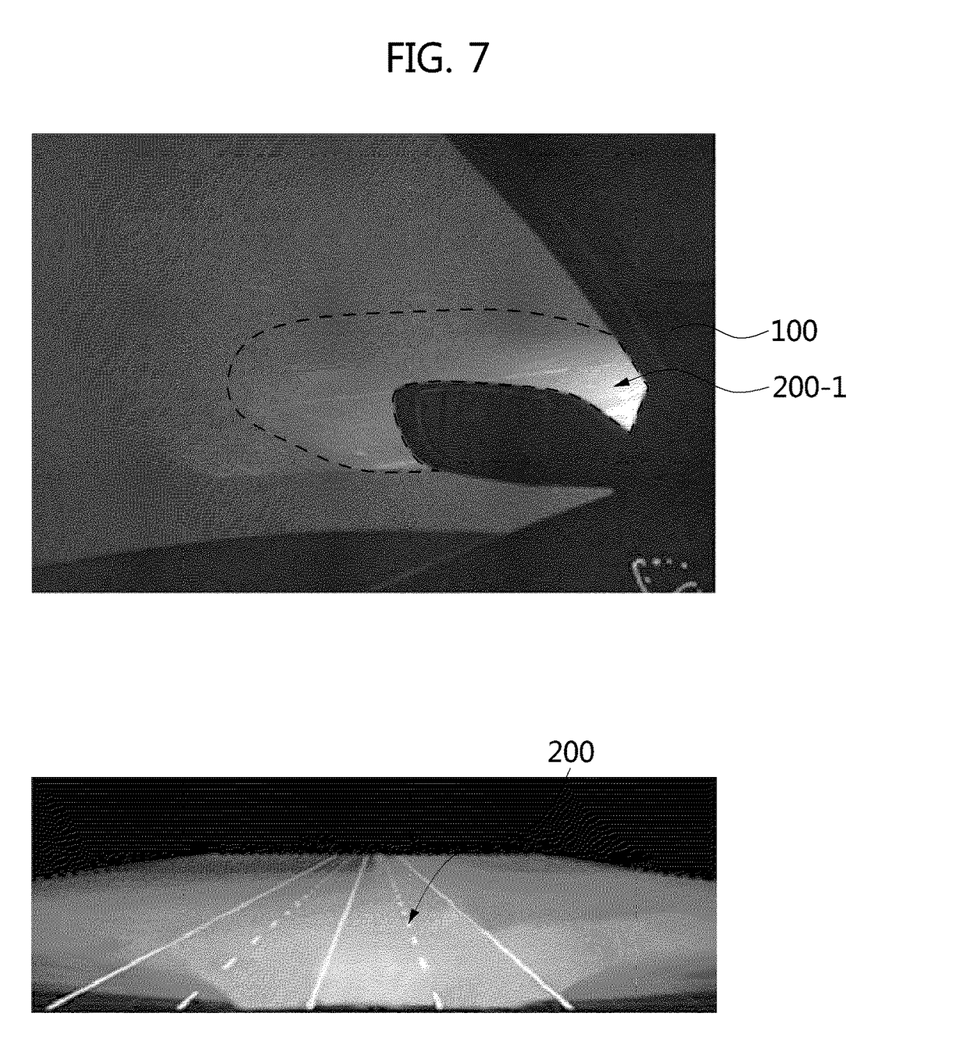
FIG. 7 is a view illustrating a state that a projection headlamp according to an exemplary embodiment of the present invention is applied to a vehicle and a field of view in front of the vehicle is formed by a low beam.

On the other hand, FIGS. 6 and 7 show a low beam operating state of the projection headlamp 1.

Referring to FIG. 6, when the projection headlamp 1 is operated by manipulation of a switch by the driver, a low beam is set as default. That is, a switch operation signal by the driver is transferred through the terminal connector 7 to turn on the light source 10 while the prism lens 70 is held in its initial position as the lens actuator 70-1 is held in its initial state. At this time, the initial position of the prism lens 70 also means zero degree which is compared with 30 degrees that is an angle where the high beam occurs.

The light generated by the light source 10 as a light source is reflected as the lower reflecting light on the lower reflecting surface 21a of the reflector 20 and bent upward and at the same time it is also reflected as the upper reflecting light on the upper reflecting surface 21b of the reflector 20 and bent downward. Then, the lower reflecting light is projected directly to the aspheric lens 50 and transmitted through the aspheric lens 50 as a low beam LB. At the same time, the upper reflecting light is projected to the compensating lens 80 by changeover of its path by the prism lens 70. The light transmitted through the compensating lens 80 is projected to the aspheric lens 50 after the light emitted from the prism lens 70 is subjected to chrominance separation and compensation of a predetermined undesired angle, and then transmitted through the aspheric lens 50 as a prism low beam PLB. Then, the low beam LB and the prism low beam PLB which are transmitted through the aspheric lens 50 are transmitted through the lamp lens 5 and irradiated forward, generating a low beam.

Referring to FIG. 7, it can be seen that a low beam 200 of high quantity of light in which the low beam LB and the prism low beam PLB are combined with each other is irradiated with more light energy to the front of the vehicle 100 so that the front field of view becomes brighter and at the same time extension of light energy to the side of the vehicle 100 occurs so that brightness of the side extended field of view 200-1 is also further improved. This result has been experimentally demonstrated.

Figure 8:
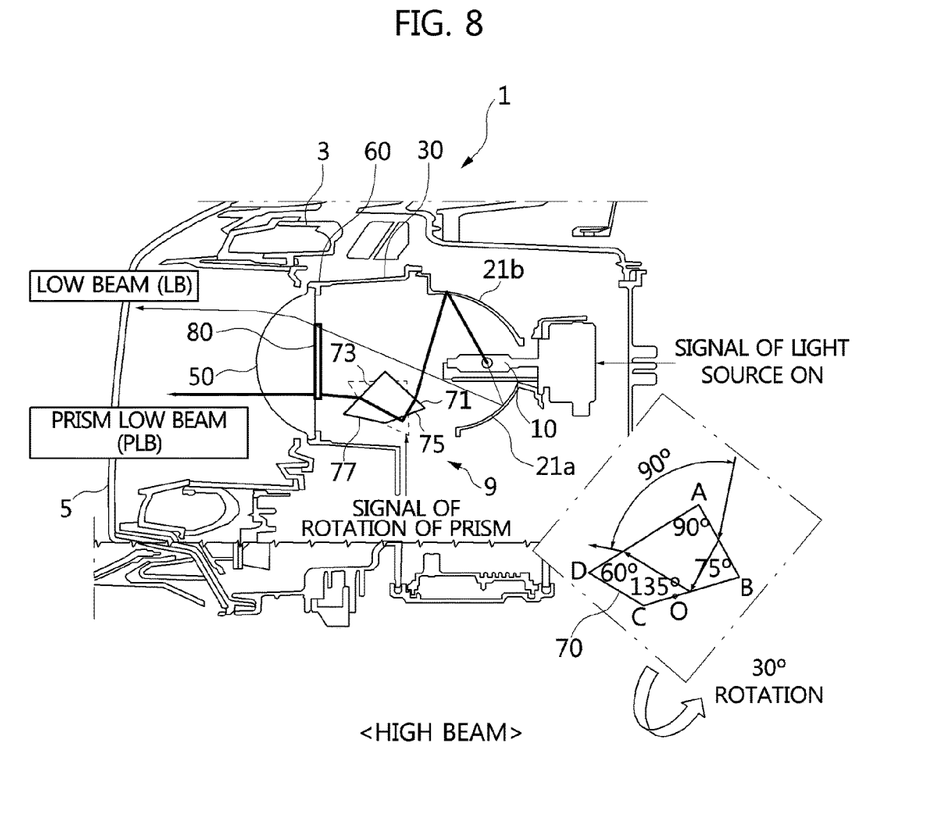
FIG. 8 is a view illustrating a high beam operating state of the projection headlamp according to an exemplary embodiment of the present invention.
Figure 9:
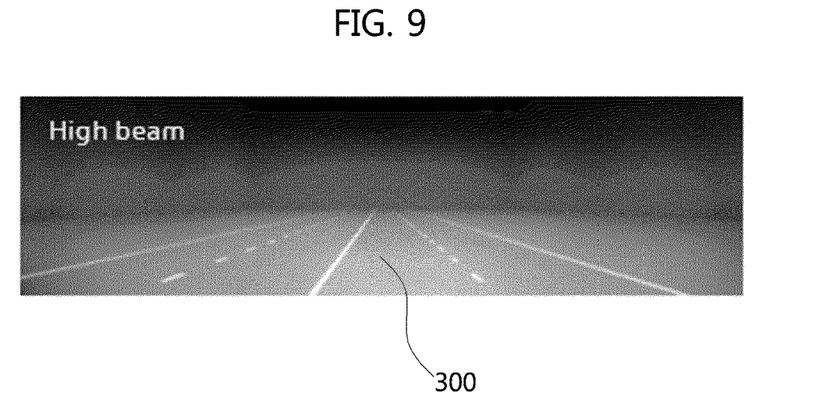
FIG. 9 is a view illustrating a state that a projection headlamp according to an exemplary embodiment of the present invention is applied to a vehicle and a field of view in front of the vehicle is formed by a high beam.

On the other hand, FIGS. 8 and 9 show a high beam operating state of the projection headlamp 1. Hereinafter, it is assumed that the high beam is switched from the low beam state.

Referring to FIG. 8, a switch operation signal by the driver is transferred through the terminal connector 7 and hence the lens actuator 70-1 operates to rotate the prism lens 70 by approximately 30 degrees, so that the prism lens 70 is changed to a position rotated by 30 degrees from its initial position. As a result, as an incident angle of the upper reflecting light relative to the prism lens 70 is also changed by 30 degrees but a polarization angle of 90 degrees is still maintained, an output angle of the prism lens 70 goes down to the bottom by 30 degrees compared to 0 degree.

the light generated by the light source 10 as a light source is reflected as the lower reflecting light on the lower reflecting surface 21a of the reflector 20 and bent upward and at the same time it is also reflected as the upper reflecting light on the upper reflecting surface 21b of the reflector 20 and bent downward. Then, the lower reflecting light is projected directly to the aspheric lens 50 and transmitted through the aspheric lens 50 as a low beam LB. At the same time, the upper reflecting light enters into the prism lens 70 at the incident angle of the high beam bent by 30 degree compared to the incident angle of the low beam and hence the path of the output angle of the high beam is changed to the upper side 30 degrees lower than the output angle of the low beam so that the upper reflecting light is projected to the lower portion of the compensating lens 80. Then, the light transmitted through the compensating lens 80 is projected to the aspheric lens 50 after the light emitted from the prism lens 70 is subjected to chrominance separation and compensation of a predetermined undesired angle, and then transmitted through the aspheric lens 50 as a prism high beam PHB. Then, the low beam LB and the prism high beam PHB which are transmitted through the aspheric lens 50 are transmitted through the lamp lens 5 and irradiated forward, generating a high beam.

Referring to FIG. 9, it can be seen that a high beam 300 of high quantity of light in which the low beam LB and the prism high beam PHB are combined with each other is irradiated with more light energy to the front of the vehicle 100 so that the front field of view becomes brighter and performance of securing the front field of view is also further improved. This result has been experimentally demonstrated.

Figure 10:
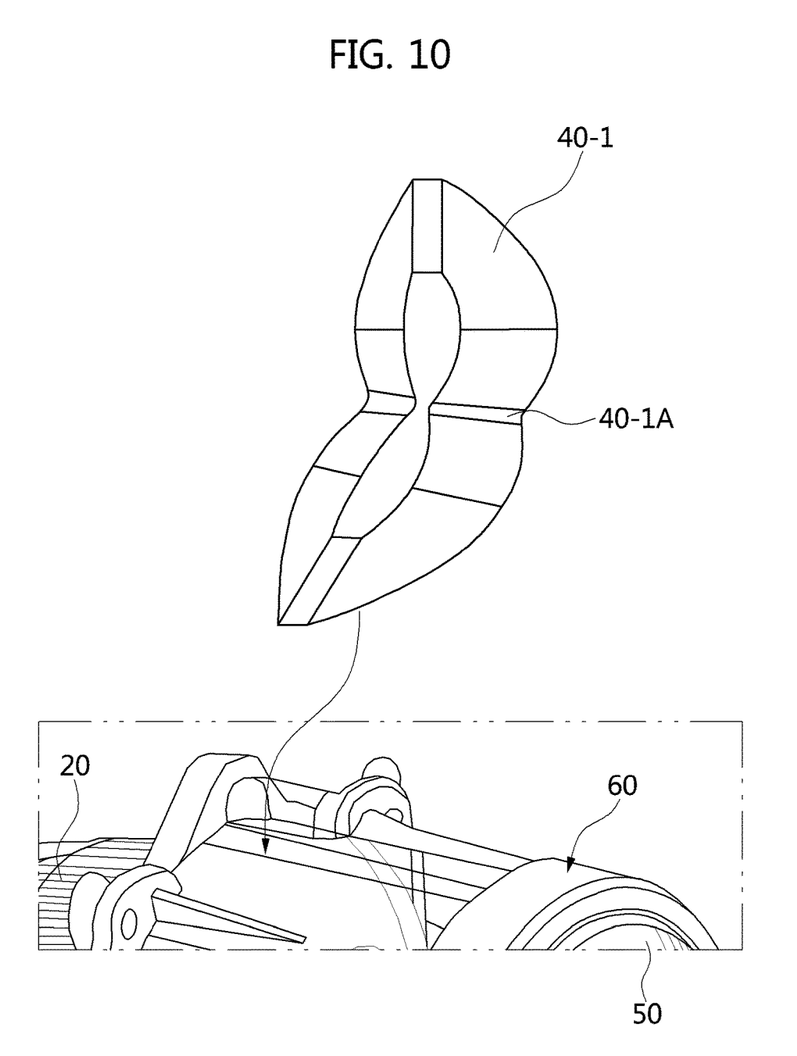
FIG. 10 is a view illustrating an example that an adaptive driving beam (ADB) shield is applied to a projection optical system according to an exemplary embodiment of the present invention for an ADB mode.
Figure 11:
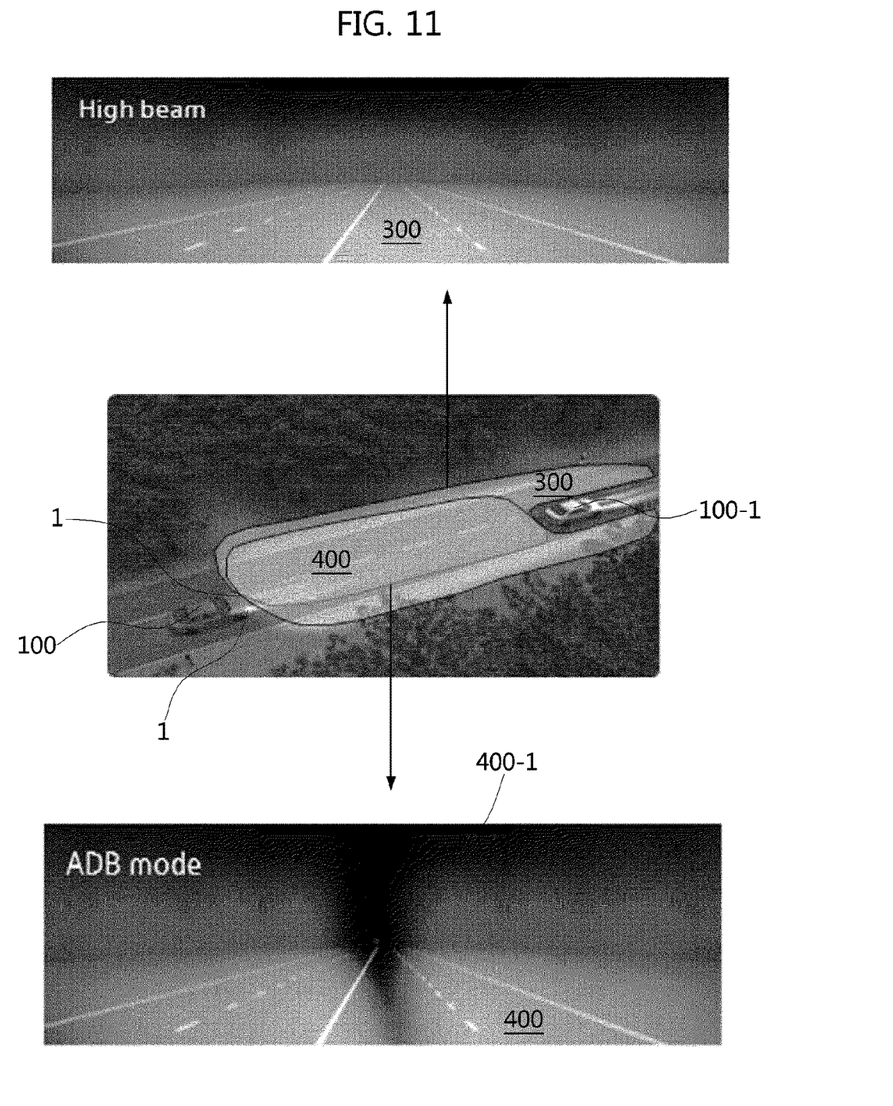
FIG. 11 is a view illustrating a state that a projection headlamp according to an exemplary embodiment of the present invention is applied to a vehicle and an ADB mode is realized during activation of a high beam.

FIG. 10, and FIG. 11 show an example that the projection optical system 9 to which an adaptive driving beam (ADB) shield 40-1 is applied implements an ADB mode. In the instant case, the ADB mode means operation of the headlamp, by which a shadow zone is formed during activation of the high beam.

Referring to FIG. 10, the projection optical system 9 includes the ADB shield 40-1 applied to the projection holder 30. The ADB shield 40-1 is positioned to be associated with the prism lens 70 within the inside space of the projection holder 30 and the outer appearance of the ADB shield 40-1 is formed in a peanut shape by changing its inside angle and shape such that a shadow zone forming surface 40-1A is formed, so that the shadow zone is formed when the ADB mode is operated. The ADB shield 40-1 is linked to the lens actuator 70-1 which rotates the prism lens (70) to move, or otherwise a separate ADB actuator or ADB solenoid valve is applied to the ADB shield such that operation of the ADB shield is controlled by manipulation of a switch.

Therefore, similarly to the projection optical system 9 described through FIGS. 1 to 9 except for the ADB shield 40-1, this projection optical system 9 also includes a bulb 10, a reflector 20, a projection holder 30, an aspheric lens 50, a sitting rim 60, a prism lens 70, and a compensating lens 80.

Referring to FIG. 11, the driver of the vehicle 100 equipped with the projection headlamp 1 switches to the ADB mode when he/she finds an upcoming vehicle 100-1 during running the vehicle with the front field of view secured by the high beam 300 of high quantity of light. Then, the shadow zone forming surface 40-1A of the ADB shield 40-1 blocks a portion of the light being projected to the aspheric lens 50 so that the high beam 300 of high quantity of light is changed to an ADB high beam 400 in which the shadow zone 400-1 is formed. As a result, the high beam 300 of high quantity of light of the vehicle 100 does not affect the upcoming vehicle 100-1. The driver of the upcoming vehicle 100-1 does not suffer inconvenience due to dazzling light.

As described above, the projection headlamp according to the present exemplary embodiment includes a dual light path forming type projection optical system 9 including a reflector 20 on which light generated from a bulb 10 is formed into a lower reflecting light reflected to an upward path directing upward and an upper reflecting light reflected to a downward path directing downward simultaneously, a prism lens 70 through which the upper reflecting light is emitted as a prism low beam in which the downward path is changed into the upward path, and an aspheric lens 50 for irradiating a low beam by adding the prism low beam to the lower reflecting light, wherein it is applied to a headlamp for a vehicle, and enhances efficiency of using light energy by allowing the prism lens 70 to utilize as quantity of light for a low beam and a high beam the light that may not be utilized due to blocking out by a shield during operation in the prior art and, increases luminance efficiency of the projection headlamp 1 significantly without any necessary to improve a transmission factor, a blocking factor and a reflection factor which are difficult to improve.

For convenience in explanation and accurate definition in the appended claims, the terms "upper", "lower", "inner", "outer", "up", "down", "upper", "lower", "upwards", "downwards", "front", "rear", "back", "inside", "outside", "inwardly", "outwardly", "interior", "exterior", "inner", "outer", "forwards", and "backwards" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A dual light path forming type projection optical system comprising:

a reflector formed in a funnel shape forming a reflecting surface for reflecting each of a lower reflecting light and an upper reflecting light, wherein the funnel shape allows light generated from a light source to be formed into the lower reflecting light reflected to an upward path directing upward and the upper reflecting light reflected to a downward path directing downward;

a prism lens subdivided into a light source incident surface forming an incident angle, a light source output surface forming an output angle, a light source reflecting surface opposite to the light source output surface, and a prism forming surface opposite to the light source incident surface, wherein a shape formed of the light source incident surface, the light source output surface, the light source reflecting surface and the prism forming surface allows the upper reflecting light to be emitted as a prism low beam in which the downward path is changed into the upward path and allows the prism low beam to be changed into a prism high beam by changing an incident angle of the upper reflecting light; and an aspheric lens for generating a low beam by allowing the prism low beam to be added to the lower reflecting light and generating a high beam by allowing the prism high beam to be added to the lower reflecting light.

2. The dual light path forming type projection optical system according to claim 1, wherein a path of the lower reflecting light is formed above a path of the prism low beam and a path of the prism high beam.

3. The dual light path forming type projection optical system according to claim 1, wherein rotation of the prism lens causes a change of the incident angle of the upper reflecting light.

4. The dual light path forming type projection optical system according to claim 3, wherein the rotation of the prism lens is generated by a signal for high beam operation.

5. The dual light path forming type projection optical system according to claim 1, wherein the incident angle of the light source incident surface and the output angle of light source output surface in the prism lens are orthogonal with each other.

6. The dual light path forming type projection optical system according to claim 1, wherein the light source incident surface is orthogonal to the light source output surface.

7. The dual light path forming type projection optical system according to claim 1, wherein a compensating lens is positioned between the aspheric lens and the prism lens and wherein the compensating lens is configured to compensate each of the prism low beam and the prism high beam.

8. The dual light path forming type projection optical system according to claim 7, wherein the compensating lens is positioned beside the aspheric lens in a position deviated from a path of the lower reflecting light directing to the aspheric lens.

9. The dual light path forming type projection optical system of claim 8, wherein the compensating lens receives the prism low beam at an upper portion thereof and the prism high beam at a lower portion thereof.

10. The dual light path forming type projection optical system according to claim 1, wherein the reflecting surface of the reflector is formed in an elliptical shape.

11. The dual light path forming type projection optical system according to claim 1, wherein the reflector and the aspheric lens are connected by a projection holder and the prism lens is positioned in an inside space of the projection holder.

12. The dual light path forming type projection optical system according to claim 11, wherein a sitting rim is coupled with the projection holder and the sitting rim maintains an assembled condition of the projection holder and the aspheric lens.

13. A projection headlamp comprising:
the dual light path forming type projection optical system of the claim 1;
a lamp lens for irradiating forward each of the low beam and the high beam emitted from the dual light path forming type projection optical system; and
a lamp housing to which the lamp lens is coupled.

14. The projection headlamp according to claim 13, wherein the lamp housing includes a terminal connector and the terminal connector allows the dual light path forming type projection optical system to be supplied with power and allows control signal for changeover between the low beam and the high beam to be input.

15. The projection headlamp according to claim 13, wherein the lamp housing includes a lens actuator for actuating the prism lens of the dual light path forming type projection optical system and wherein one of the low beam and the high beam is selected by driving the lens actuator.

16. The projection headlamp according to claim 13, wherein the dual light path forming type projection optical system further includes an adaptive driving beam (ADB) shield and wherein the ADB shield forms a shadow zone in the high beam of the dual light path forming type projection optical system.

17. A vehicle comprising:
the projection headlamp of the claim 13, wherein the projection headlamp is applied as a headlight on both predetermined sides of the vehicle.

18. The vehicle according to claim 17, wherein the projection headlamp further includes an adaptive driving beam (ADB) shield and wherein the ADB shield forms a shadow zone in the high beam of the dual light path forming type projection optical system.

* * * * *